US010959583B2

(12) United States Patent
    Valentini

(10) Patent No.: US 10,959,583 B2
(45) Date of Patent: Mar. 30, 2021

(54) VACUUM CLEANER

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 192 days.

(21) Appl. No.: 16/196,191

(22) Filed: Nov. 20, 2018

(65) Prior Publication Data

US 2019/0150683 A1    May 23, 2019

(30) Foreign Application Priority Data

Nov. 22, 2017  (EP) .................... 17203154

(51) Int. Cl.
   *B01D 49/00*    (2006.01)
   *A47L 5/22*    (2006.01)
   (Continued)

(52) U.S. Cl.
   CPC ............. *A47L 5/22* (2013.01); *A47L 5/365* (2013.01); *A47L 7/0085* (2013.01); *A47L 9/102* (2013.01);
   (Continued)

(58) Field of Classification Search
   CPC .......... A47L 5/22; A47L 7/0085; A47L 5/365; A47L 9/102; A47L 9/2868; B01D 46/10;
   (Continued)

(56) References Cited

U.S. PATENT DOCUMENTS 2,280,495 A  *  4/1942  Martinet ................. A47L 5/365
                                                      43/124
2,731,194 A  *  1/1956  Kent ....................... A47L 5/22
                                                      417/312

(Continued)

FOREIGN PATENT DOCUMENTS

EP    3127462 A1      2/2017
JP    08168451 A  *   7/1996
           (Continued)

OTHER PUBLICATIONS

English language Abstract of WO2016008860.
English language Abstract of KR100812285.
English language Abstract of JP2004135992.

*Primary Examiner* — Dung H Bui
(74) *Attorney, Agent, or Firm* — Ware, Fressola, Maguire & Barber LLP

(57) ABSTRACT

The invention refers to a vacuum cleaner (10) comprising a housing (15) with first components arranged therein which interoperate with one another in order to realize a first air flow (42''') for a vacuum cleaning functionality. The first components comprise a first electric motor (40) and a first turbine (38) actuated by the first electric motor (40) in order to create the first air flow (42''') and a low-pressure in a dust collecting chamber (22) of the vacuum cleaner (10) provided with an inlet opening (24) in order to suck in dust and small particles into the dust collecting chamber (22). The vacuum cleaner (10) further comprises second components separate from the first components and the second components interoperate with one another in order to realize a second air flow (100) for a purifying functionality of dust-laden air surrounding the vacuum cleaner (10). The second components comprise a second electric motor (96), a second turbine (98) actuated by the second electric motor (96) in order to create the second air flow (100), and at least one air filter element (104) through which the second air flow (100) is drawn in order to filter out most of the dust contained in the dust-laden air of the second air flow (100).

20 Claims, 6 Drawing Sheets

Figure 1:
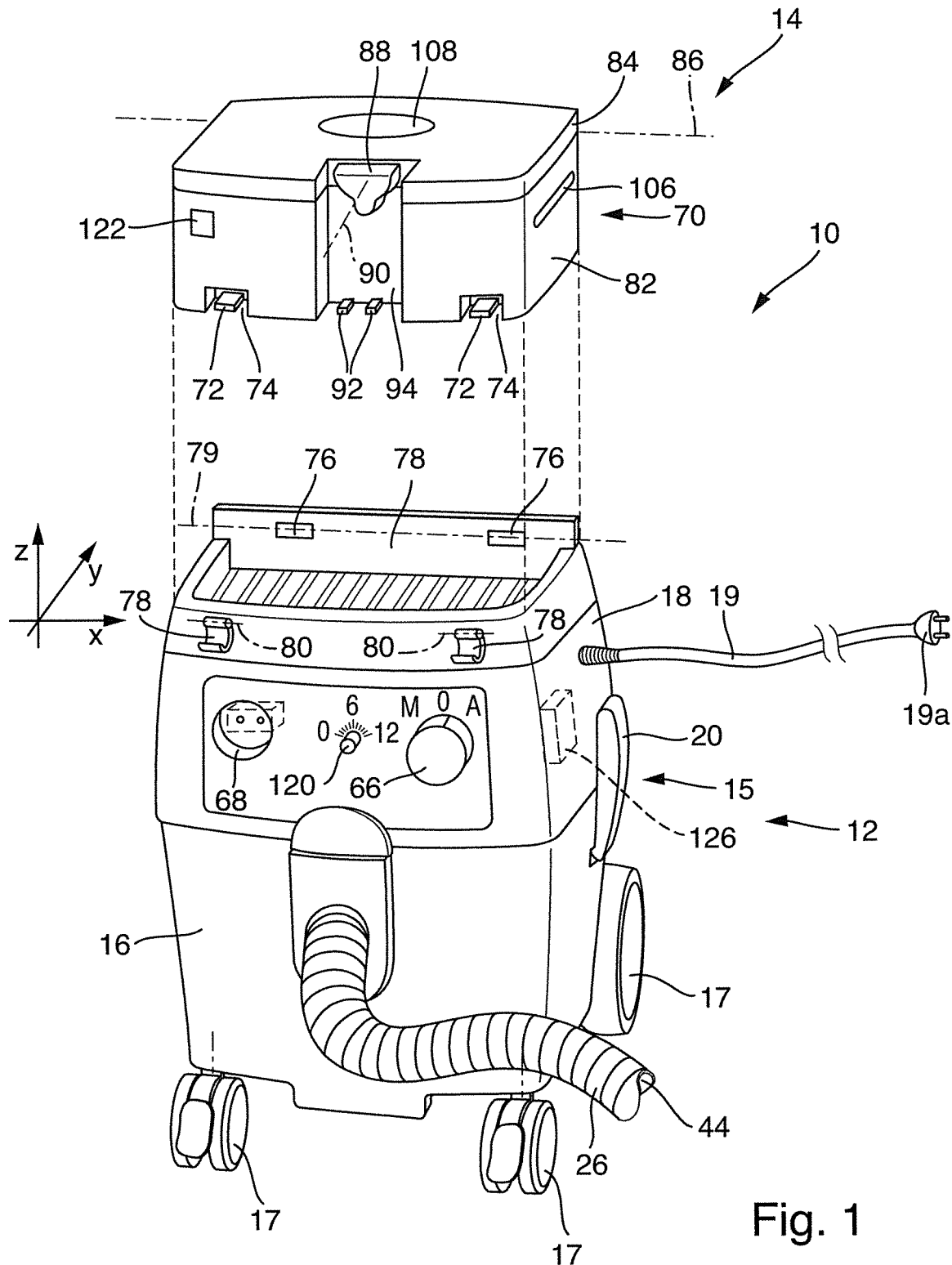

(51) Int. Cl.
| | |
|---|---|
| *A47L 9/10* | (2006.01) |
| *A47L 9/28* | (2006.01) |
| *B01D 46/10* | (2006.01) |
| *B01D 46/44* | (2006.01) |
| *B01D 46/00* | (2006.01) |
| *A47L 7/00* | (2006.01) |
| *A47L 5/36* | (2006.01) |
| *B01D 45/12* | (2006.01) |
| *B01D 45/16* | (2006.01) |
| B01D 50/00 | (2006.01) |
| B04C 9/00 | (2006.01) |
| B01D 46/24 | (2006.01) |

(52) U.S. Cl.
CPC ............ *A47L 9/2868* (2013.01); *B01D 45/12* (2013.01); *B01D 45/16* (2013.01); *B01D 46/0068* (2013.01); *B01D 46/10* (2013.01); *B01D 46/442* (2013.01); B01D 46/2411 (2013.01); B01D 50/002 (2013.01); B01D 2279/55 (2013.01); B04C 2009/002 (2013.01)

(58) Field of Classification Search
CPC .............. B01D 46/442; B01D 46/0068; B01D 2279/55; B01D 45/12; B01D 45/16; B01D 46/2411; B01D 50/002; B04C 2009/002
See application file for complete search history.

(56) References Cited

U.S. PATENT DOCUMENTS

| | | | | | |
|---|---|---|---|---|---|
| 3,485,671 | A * | 12/1969 | Stephens | ................ | F24F 13/02 134/7 |
| 3,732,667 | A * | 5/1973 | Fromknecht | .............. | A47L 9/26 55/373 |
| 3,771,294 | A * | 11/1973 | Ronning | ................ | B65G 53/60 55/345 |
| 3,842,461 | A * | 10/1974 | Wurster | .................... | B08B 5/04 15/326 |
| 3,955,236 | A * | 5/1976 | Mekelburg | ............... | E04D 15/07 15/314 |
| 4,198,290 | A * | 4/1980 | Summers | ............... | B01D 45/12 209/710 |
| 4,201,256 | A * | 5/1980 | Truhan | ................... | B01D 45/12 144/252.2 |
| 4,231,133 | A * | 11/1980 | Probost | ................ | A47L 7/0042 15/353 |
| 4,735,639 | A * | 4/1988 | Johnstone | ................ | A47L 5/365 55/302 |
| 4,852,208 | A * | 8/1989 | Morishita | ............. | A47L 9/2842 15/339 |
| 5,062,868 | A * | 11/1991 | Kennedy | ................... | B60P 1/60 15/340.1 |
| 5,158,583 | A * | 10/1992 | Bodin | ..................... | G21F 9/005 299/1.4 |
| 5,231,805 | A * | 8/1993 | Sander | .................... | B24C 3/067 451/88 |
| 5,560,075 | A * | 10/1996 | Jankowski | ............. | A47L 5/365 15/327.2 |
| 5,606,767 | A * | 3/1997 | Crlenjak | .................... | A47L 5/38 15/301 |
| 5,716,260 | A * | 2/1998 | Griffin | ................... | B24C 3/065 451/350 |
| 6,334,234 | B1 * | 1/2002 | Conrad | ..................... | A47L 5/30 15/347 |
| 6,381,803 | B1 * | 5/2002 | Berfield | .................... | A47L 5/14 15/330 |
| 6,471,751 | B1 * | 10/2002 | Semanderes | ........... | B01D 45/12 55/300 |
| 6,804,857 | B1 * | 10/2004 | Olewiler, III | ............. | A47L 5/22 15/326 |
| 6,833,016 | B2 * | 12/2004 | Witter | ................... | B01D 50/002 451/88 |
| 7,282,074 | B1 * | 10/2007 | Witter | .................... | B01D 45/12 451/453 |
| 7,399,218 | B2 * | 7/2008 | Witter | .................... | B24B 55/06 451/353 |
| 7,559,268 | B2 * | 7/2009 | Sasaki | .................. | B23D 59/006 83/100 |
| 7,761,957 | B2 * | 7/2010 | Gabric | ...................... | A47L 9/00 15/412 |
| 8,337,580 | B2 * | 12/2012 | Manska | .................. | B01D 45/16 55/394 |
| 8,720,000 | B2 * | 5/2014 | Pedrazzini Bertolazzi | ................. | A47L 9/22 15/339 |
| 9,107,550 | B2 * | 8/2015 | Sergyeyenko | .......... | B24B 55/10 |
| 2002/0178536 | A1 * | 12/2002 | Valentini | ................ | A47L 5/365 15/352 |
| 2004/0053561 | A1 * | 3/2004 | Pieper | ................... | B24C 1/086 451/38 |
| 2004/0103494 | A1 * | 6/2004 | Valentini | ................ | B25H 3/00 15/339 |
| 2004/0226272 | A1 * | 11/2004 | Valentini | ............ | B23Q 11/0046 55/385.1 |
| 2006/0070206 | A1 * | 4/2006 | Fischer | ................. | A47L 9/2842 15/334 |
| 2006/0130646 | A1 * | 6/2006 | Seo | ........ | A47L 9/2805 95/8 |
| 2007/0251199 | A1 * | 11/2007 | Valentini | ............ | B01D 46/0045 55/385.1 |
| 2008/0016830 | A1 * | 1/2008 | Witter | .................. | B01D 46/521 55/337 |
| 2008/0172146 | A1 * | 7/2008 | Lin | ........ | G05D 1/021 700/245 |
| 2008/0209669 | A1 * | 9/2008 | Kah | ........ | A47L 9/1608 15/350 |
| 2008/0230446 | A1 * | 9/2008 | Bertram | .............. | A47L 9/1683 209/10 |
| 2011/0047747 | A1 * | 3/2011 | Van Herpen | ............ | A47L 9/327 15/410 |
| 2011/0296648 | A1 * | 12/2011 | Kah, Jr. | .................. | B04C 5/04 15/353 |
| 2012/0137466 | A1 * | 6/2012 | Duncan | .................. | B65H 75/42 15/323 |
| 2014/0167931 | A1 * | 6/2014 | Lee | ..................... | H04L 12/2818 340/12.5 |
| 2016/0100724 | A1 * | 4/2016 | Valentini | ................... | A47L 9/20 134/18 |
| 2016/0151872 | A1 * | 6/2016 | Glauning | ............. | B23Q 17/0985 173/3 |
| 2016/0173318 | A1 * | 6/2016 | Ha | ........................ | H04L 12/282 709/223 |
| 2016/0202703 | A1 * | 7/2016 | Matsubara | ........... | G05D 1/0246 701/24 |
| 2016/0234036 | A1 * | 8/2016 | Hatambeiki | ........ | H04L 12/6418 |
| 2017/0303754 | A1 * | 10/2017 | Conrad | .................... | A47L 5/28 |
| 2020/0229660 | A1 * | 7/2020 | Tsuchida | ................ | A47L 5/22 |

FOREIGN PATENT DOCUMENTS

| | | |
|---|---|---|
| JP | 2004135992 A | 5/2004 |
| KR | 100812285 B1 | 3/2008 |
| WO | 2016008860 A1 | 1/2016 |

* cited by examiner

VACUUM CLEANER

The present invention refers to a vacuum cleaner, in particular a mobile vacuum cleaner which can be moved to its destination of use or working environment on wheels or a trolley. The vacuum cleaner may be used in a household or an office building for regular cleaning purposes, in a private or professional workshop or garage, on a construction site or the like. The vacuum cleaner is adapted to draw in dry dust, small particles, small pieces of debris or the like, as well as liquids.

In the realm of the present invention the term 'vacuum cleaner' is not limited to mobile vacuum cleaners for use in households, professional workshops, garages or on construction sites. It also comprises so-called 'safety dust extractors' comprising a suction hose which is connected to a dust self-extracting channel of a power tool, like a sander or a polisher, in order to draw in dust and other small particles generated during an intended use of the power tool on the working surface.

The vacuum cleaner comprises a housing with first components arranged therein which interoperate with one another in order to realize a first air flow for a vacuum cleaning functionality. The first components comprise a first electric motor and a first turbine actuated by the first electric motor in order to create the first air flow and a low-pressure or vacuum in a dust collecting chamber of the vacuum cleaner. The dust collecting chamber is provided with an inlet opening in order to such in dust and small particles into the dust collecting chamber. Usually a suction hose or tube having a suction opening at its distal end is connected to the inlet opening. The hose or tube may be used for cleaning small areas of a working space, e.g. a floor or a working bench. The hose may also be connected to a dust self-extracting channel of a power tool, like a sander or a polisher. Due to the first air flow created by the turbine a high-speed but low-volume air flow is generated in the hose or tube, creating a strong airstream which carries away dust and small particles laying on the floor or from the working space of the power tool.

The air flow with the dust and particles is sucked into the dust collecting chamber, where the larger and heavier particles fall to the bottom. The air flow is then drawn through at least one filter element which filters the remaining smaller particles out of the air flow. Then the air flow runs through the turbine. After passing through the turbine the air is discarded into the environment through appropriate air outlet openings provided in the housing of the vacuum cleaner. The vacuum cleaner may be provided with a self-cleaning or reverse-flushing function of the at least one filter element. Preferably, the self-cleaning function is occasionally automatically activated either when a desired low-pressure value in the dust collecting chamber can no longer be reached (that is when the pressure in the chamber exceeds a threshold value) or regularly from time to time.

Dust, powder and small particles can be so small that they float in the air and from there may be inhaled and reach the bronchia, where they can cause considerable damage. Air purifiers can filter dust, powder and small particles floating in the air thereby avoiding health threats for people working in such environments with dust-laden air. Air purifiers for filtering large volumes of air and for removing dust and small particles floating in the air within a given volume, e.g. a room or an almost closed space, are well known in the art. In contrast to vacuum cleaners which are activated occasionally, air purifiers are usually provided for long term use. Therefore, their motors have a smaller power (e.g. 20 to 300 W) than those of vacuum cleaners (usually more than 1.000 W). Furthermore, air purifiers are not adapted to generate a very low low-pressure (i.e. a large vacuum) in a chamber or the like but are instead optimized for realizing a large-volume air circulation (up to 1.000 m$^3$/hour). An example for such an air purifier is the Aircleaner AC700 from Klop Innovations, Hermesweg 11A, 4051 BV Ochten, NL. This air purifier circulates an air volume of up to 700 m$^3$/hour. The known air purifiers are stand-alone solutions. When used in professional environments, for example in a professional workshop or garage or on a construction site, they often are in the way, get tripped over or damaged. In order to avoid this, the known air purifier is made of high quality components and has a rugged housing made of Styrofoam. This makes the known air purifier very bulky and expensive.

Furthermore, a vacuum cleaner named HYLA EST is known in the art, which is manufactured and sold by Hyla Germany GmbH, Hornbergstraße 35, 70794 Filderstadt, DE. This vacuum cleaner claims to have an air purifying functionality integrated therein. Basically, it is just a conventional vacuum cleaner which is provided with a rather efficient hydraulic filtering system for filtering the sucked air before it is discarded into the environment. The vacuum cleaner has only one motor which serves for realizing the vacuum cleaning functionality as well as the air purifying functionality. Despite the fact that the vacuum cleaner can be operated in a special air purifying mode, it still remains a compromise. In the air purifying mode the power consumption is relatively high (the same as in the vacuum cleaning mode because the same motor is used) and the circulated air volume is relatively small (150 m$^3$/hour). Compared to conventional air purifiers the efficiency of the air purifying functionality of this known vacuum cleaner is rather poor. In particular the air purifying performance is limited due to the fact that regular vacuum cleaner components, optimized for vacuum cleaning, are used for trying to achieve the air purifying functionality. Further, this vacuum cleaner is not intended for professional use, for example in a professional workshop or garage or on a construction site. It is technically too sophisticated and too weak to be used in a professional environment. Both the vacuum cleaning performance as well as the air purifying performance is not sufficient for professional use. Another disadvantage is the fact that the air purifying functionality cannot be used contemporarily with the vacuum cleaning functionality. Furthermore, after operation of this vacuum cleaner the water from the hydraulic filtering system comprises particles of various compositions. This water cannot simply be flushed down the drain but has to be disposed of in an environmentally responsible way which is cumbersome, time-consuming and expensive.

Based on the above, it is an object of the present invention to provide for an easy, safe, efficient and economic air purifying functionality, in particular for use in a rough professional environment, for example in a professional workshop or garage or on a construction site.

This object is solved by a vacuum cleaner with the features of claim 1. Starting from the vacuum cleaner of the above identified kind, it is suggested that the vacuum cleaner further comprises second components separate from the first components and the second components interoperating with one another in order to realize a second air flow for a purifying functionality of dust-laden air surrounding the vacuum cleaner. The second components comprise a second electric motor, a second turbine actuated by the second electric motor in order to create the second air flow, and at least one air filter element through which the second air flow is drawn in order to filter out most of the dust contained in the air of the second air flow. The second components are adapted to circulate a larger volume of air per time unit than the first components. They are adapted for long-term activation, i.e. operated continuously for several hours. A low-pressure or vacuum created by the first turbine in the dust collecting chamber is much lower than a low-pressure created by the second turbine on its suction side (hence, the first turbine creates a much larger depression in the vacuum chamber than the depression created by the second turbine).

The main object of the first components is to realize the functionality of a vacuum cleaner and suck in dust, dirt and small particles discarded and laying on a surface, e.g. the floor, a worktop or the like, into a dust collection chamber. In the case of a safety dust extractor the first components serve for drawing in dust and other small particles (e.g. abrasive dust, residual dried abrasive liquid or paste, sawdust, drill dust, swarf or the like) generated during an intended use of the power tool. The vacuum cleaner sucks in dust, dirt and small particles from where they are laying around or where they are created. The first air flow generated by the first components in a tube or hose is rather large (e.g. around 20 m/s or higher). The volume of circulated air per time unit is rather small (e.g. around 150 $m^3/h$).

The main object of the second components interoperating with each other is to purify a volume of air surrounding the vacuum cleaner. The second air flow generated by the second components is rather small (e.g. around 0.5 m/s or lower). The volume of circulated air per time unit is rather large (e.g. up to around 1000 $m^3/h$). The second components can be operated separately from the first components.

The vacuum cleaner according to the present invention has the advantage that it cannot only fulfil a vacuum cleaning functionality in a rough professional environment, but also an efficient and effective air purifying functionality. This is achieved by integrating separate second components into the vacuum cleaner which provide for the air purifying functionality. These second components can be optimized for the air purifying functionality without having to consider the vacuum cleaning functionality, because this is performed exclusively by the first components. Further, both functionalities can be performed contemporarily.

The integration of an air purifying functionality into a vacuum cleaner is particularly advantageous when the vacuum cleaner is used in rough environments, such as a professional workshop or garage, a shipyard, a hangar, a construction site or the like. For example, when sanding or polishing a vehicle body, a hull of a boat or an airplane, a large amount of dust and small debris particles is generated and spread in the air, despite the fact that the sander or polisher used may be attached to a vacuum cleaner for removing some of the dust and small particles from the working area and for collecting it in the dust collecting chamber of the vacuum cleaner. Similarly on a construction site, when certain work is performed, for example when slots for electric cables and hydraulic pipes are milled into stone or concrete walls, a large amount of dust and small debris particles is generated and spread in the air. The dust and small particles float in the air and are a health threat for people present near the working area which inhale the dust-laden air. With the present invention not only can the vacuum cleaner be attached to the sander or polisher and can it be used for removing dust and small particles from the working area and for collecting it in the dust collecting chamber of the vacuum cleaner, but additionally the separate air purifier integrated into the vacuum cleaner can perform a highly efficient air purifying functionality for further reducing the number of small particles in the air. The air purifying functionality can be realized any time before, during and after the use of the vacuum cleaner or of the sander/polisher, respectively.

According to a preferred embodiment of the invention the second components for realizing the air purifying functionality are arranged within the housing of the vacuum cleaner. In particular, it is suggested that the housing of the vacuum cleaner comprises a base element essentially forming the dust collecting chamber and a cover element releasably attachable to the base element and containing the first components and the second components. So basically, the vacuum cleaner comprises a large dust collecting chamber in the base element of the housing, and the cover element contains all the electric, electrical and pneumatic components for realizing the vacuum cleaning functionality (when the cover element is attached to the base element) and the air purifying functionality. The air purifying functionality could possibly even be realized with the cover element separated from the base element. The components contained in the cover element further comprise one or more of the following: filter elements, pneumatic valves, electromagnetic valves, a control unit with a computer processor, electric switches and control dials, a display unit, an electric cord with a plug for connection to a mains socket, a timer switch, a particle sensor, a wireless interface, and a rechargeable battery.

Despite the fact that the second electric motor, the second turbine and the at least one filter element of the air purifier are designed separately from the respective first components of the vacuum cleaner, nonetheless some components could be used for the vacuum cleaning functionality as well as for the air purifying functionality. For example, a control unit for controlling operation of the vacuum cleaner could also be used for controlling operation of the air purifier. Further, a display unit could be used for displaying the current status and/or operation parameters of the vacuum cleaner as well as of the air purifier. Furthermore, a control unit with a computer processor could be used for controlling both the vacuum cleaning functionality as well as the air purifying functionality. A computer program running on the processor could be extended accordingly. A rechargeable battery could be used for operating the first electric motor as well as the second electric motor. According to the invention in particular those components which have an effect on the efficiency of the air purifying functionality are provided separately from the respective components for the vacuum cleaning functionality.

The invention has the advantage that the air purifier forms an integral part of the vacuum cleaner. It is thereby avoided that when used in professional environments, for example in a professional workshop or garage or on a construction site, the air purifier is in the way, gets tripped over or damaged. As a consequence, it is possible to use cheaper components for the air purifier, and the air purifier does not need any kind of rugged housing, thereby providing for a less bulky air purifier.

The second components further may comprise at least one, preferably a plurality of relatively large air inlet openings in the housing of the vacuum cleaner, preferably in the cover element. Furthermore, the second components may comprise at least one, preferably a plurality of relatively large air outlet openings in the housing of the vacuum cleaner, preferably in the cover element. Large air inlet and outlet openings are advantageous in order to allow a large volume of air from the environment to be sucked into the air purifier, filtered and to be discarded as purified air back into the environment. The air volume which is purified by the air purifier is preferably larger than 300 m³/hour, in particular around 700 m³/hour or higher. The inlet and outlet openings are arranged such that the purified air discarded from the air purifier through the one or more air outlet openings is not directly sucked into the air purifier again through the one or more air inlet openings. Hence, the discarded air should be directed away from the air inlet openings.

According to an alternative embodiment, the second components are arranged in an external housing or case separate from the housing containing the first components but releasably attached to the housing containing the first components. This embodiment has the advantage that the air purifier forms an integral part of the vacuum cleaner when attached to the housing containing the first components. It is in particular suggested that the external housing or case containing the second components is a stackable case which can be releasably attached to the top of the housing containing the first components, like a case known from WO 2016/008 860 A1.

In that case it is suggested that the top of the housing containing the first components and the bottom of the external housing or case containing the second components are provided with electric energy transmitting means in order to transmit electric energy from the first components to the second components (e.g. the second electric motor, a control unit) arranged in the external housing or case. Furthermore, means for transmitting control signals between the first and second components could also be provided in the housing containing the first components and the external housing or case containing the second components. Upon positioning or attachment, respectively, of the external housing or case containing the second components to the top of the housing containing the first components the electric energy transmitting means automatically enter into a mutual energy transmitting state, in which electric energy can be transmitted from the first components to the second components.

For example, the electric energy transmitting means for transmitting electric energy from the first components to the second components may be designed as a plug and socket combination at respective positions in the bottom of the external housing or case containing the second components and in the top of the housing containing the first components. Further, it would be possible that the electric energy transmitting means make use of any type of wireless power transmission technique. In so-called near field or non-radiative techniques, power is transferred by magnetic fields using inductive coupling between coils of wire, or by electric fields using capacitive coupling between metal electrodes. To this end the bottom of the external housing or case containing the second components and the top of the housing containing the first components may be provided with appropriate coils of wire, metal electrodes or the like for realizing the respective wireless power transmission technique.

Alternatively, it would also be possible that the external housing or case containing the second components is provided with a separate electric cord with a plug for connection to a mains socket, in order to provide the second components with electric energy. Yet another possibility would be to provide a rechargeable or exchangeable battery in the external housing or case. The battery could be automatically charged when the external housing or case containing the second components is placed on and secured on top of the housing containing the first components. Both embodiments have the advantage that the air purifier could also be operated when detached from the housing containing the first components.

According to a preferred embodiment, the vacuum cleaner comprises a single electric cord with a plug for connection to a mains socket. The electric cord is adapted for supplying the first electric components (e.g. the first electric motor, a control unit) as well as the second electric components (e.g. the second electric motor, a control unit) with electric energy. In case the second components of the air purifier are arranged in an external housing or case separate from the housing containing the first components of the vacuum cleaner and if the electric cord leads into the housing containing the first components, some kind of electric energy transmitting means of the above identified kind may be provided for transmitting electric energy from the electric cord to the second components. This embodiment has the advantage that only one mains socket is needed for operating both the vacuum cleaner and the air purifier. Usually, mains sockets are rather rare in construction sites and professional workshops or garages and/or already occupied by plugs from other electric power tools and appliances in use there. Further, by reducing the number of electric cords connecting mains sockets with electric appliances and power tools the danger of tripping over one of these electric cords and injuring oneself is significantly reduced.

Furthermore, it is suggested that the vacuum cleaner comprises a rechargeable battery adapted for supplying the second electric motor of the air purifier with electric energy at least when a plug of an electric cord of the vacuum cleaner is disconnected from a mains socket. Advantageously, the battery is charged according to a predefined charging process or scheme when the plug of the electric cord of the vacuum cleaner is connected to a mains socket. For safety reasons it may be desired to disconnect the plug of the electric cord of the vacuum cleaner from the mains socket when leaving the construction site or the professional workshop or garage. By doing so, a damage to the electric parts of the vacuum cleaner or even to the entire vacuum cleaner by a short circuit and/or a stroke of lightning can be avoided. If the vacuum cleaner caught fire, there is even a risk that the entire construction site or the professional workshop or garage burns down. However, detaching the plug from the mains socket impedes a use of the air purifier at times beyond the use of the vacuum cleaner, e.g. early in the morning, late in the evening, or even during the entire night. To this end, the battery can take over the energy supply of the second electric motor of the air purifier at least when the plug is detached from the mains socket. It is even possible that the second electric motor is exclusively operated through the battery. Preferably, the battery is charged when the plug is connected to the mains socket again. Charging is effected according to a predefined charging process or scheme. According to the charging scheme the battery is not always charged when the plug is connected to the mains socket. The charging scheme may provide for an automatic charging of the battery only if its capacity falls below a predefined threshold value. Furthermore, it is possible that the charging scheme provides for some kind of conservation charging if the battery capacity is above a predefined threshold value. Further, the charging process or scheme may comprise adapting the charging current according to a current value of the battery capacity, to a battery temperature, to an outside temperature or to other external or internal battery parameters. Other charging schemes may also be applied.

There are many different possibilities for activating and/or deactivating the second electric motor of the air purifier. For instance, it is suggested that the second electric motor is automatically activated upon activation of the first electric motor of the vacuum cleaner. By doing so no separate activation of the air purifier is necessary. This greatly facilitates the use of the air purifier and assures clean and purified air near the working area during work. This is in particular advantageous for inexperienced users or workers who have not used the vacuum cleaner according to the invention with the combined vacuum cleaning and air purifying functionalities before because they might forget to separately activate the air purifier when starting work.

Further, it is suggested that the second electric motor is automatically deactivated after a preset time delay after deactivation of the first electric motor. The time delay starts after deactivation of the vacuum cleaning functionality and may be preset by a user or worker to any desired time duration. It may even be set to zero (time delay=0 sec) in order to turn off the second motor contemporarily with the first motor. However, it is advantageous that the second motor runs longer than the first motor (time delay >0 sec) in order to purify the air and filter floating dust and particles out of the air surrounding the vacuum cleaner, the dust and particles resulting from the some kind of work previously performed at a construction site or a professional workshop or garage. Purifying the air (i.e. extracting dust and particles from the dust-laden air) surrounding the vacuum cleaner may take up to several hours (e.g. time delay=appr. 1 . . . 12 hours). The time it takes for purifying dust-laden air depends on a number of factors, comprising the concentration of dust and particles in the dust-laden air at the beginning of the purification process, the size of the dust and particles, the type and size of the mounted filters of the air purifier, the efficiency of the air purifier (max. volume (e.g. $m^3$) of dust-laden air the air purifier is able to circulate per time unit (e.g. hour)).

Furthermore, it is suggested that the vacuum cleaner comprises a timer switch adapted for automatically activating and deactivating the second electric motor at preset points in time. The points in time for activating and deactivating the air purifier may be manually preset by a user or worker, for example when leaving the construction site or the professional workshop or garage after work. To this end an appropriate input device for manually setting the points in time by a user are provided in the housing of the vacuum cleaner. It could also be possible to set the points in time by means of a mobile device, for example a smart phone, if the mobile device is in an appropriate wireless data communication connection with the vacuum cleaner. The timer switch may be of a mechanical type. If it is of an electrical type, it may be provided with electric energy by means of the electric cord plugged into the mains socket, or by a battery making part of the vacuum cleaner.

Finally, it is suggested that the vacuum cleaner comprises a particle sensor which is in contact with the surroundings (i.e. the environment) of the vacuum cleaner and adapted for measuring the number of (dust and small debris) particles floating in a given volume of dust-laden air surrounding the vacuum cleaner and for automatically activating the second electric motor of the air purifier when the measured number of particles exceeds a preset first threshold value and automatically deactivating the second electric motor when the number of particles falls below a preset second threshold value. The first and second threshold values for the number of particles in a given volume may be the same. Preferably, the second threshold value is smaller than the first threshold value, thereby providing some kind of hysteresis. The first and second threshold values may be preset by the manufacturer of the vacuum cleaner and stored in a storing device of a control unit of the vacuum cleaner. Alternatively, they may be set by a user or worker to desired values.

According to yet another preferred embodiment of the invention it is suggested that the vacuum cleaner comprises a wireless interface adapted for establishing a wireless connection with a mobile device, in particular a smart phone, and control means adapted for permitting control of the first electric motor of the vacuum cleaner and/or of the second electric motor of the air purifier by means of the mobile device via the established wireless connection. Further, it is suggested that the vacuum cleaner comprises a wireless interface adapted for establishing a wireless connection with a mobile device and data transmission means adapted for transmitting operation parameters and data regarding the first components of the vacuum cleaner and/or the second components of the air purifier to the mobile device via the established wireless connection for presentation on a screen of the mobile device. In that case, there is an appropriate computer program (so-called application or App) running on the mobile device for generating and transmitting control commands to the control means and/or for receiving information on the current operational status of the vacuum cleaner and/or the air purifier from the vacuum cleaner. The operation parameters could comprise, for example, information regarding the filling level of the dust collection chamber, or information when the dust collection chamber must be or will probably have to be emptied. The operation parameters may also comprise information regarding the degree of loading (clogging) of the filter elements of the vacuum cleaner and/or of the air purifier with dust and small debris particles, or information when the filter elements must be or will probably have to be cleaned or replaced.

The mobile device is preferably one of a smart phone, a tablet computer and a palm computer. The wireless interface is adapted for realizing a Bluetooth-, WiFi-, NFC- and/or telecommunication connection (e.g. GSM, EDGE, UMTS, LTE or any other standard known at present or to be realized in future) with the mobile device.

Figure 2:
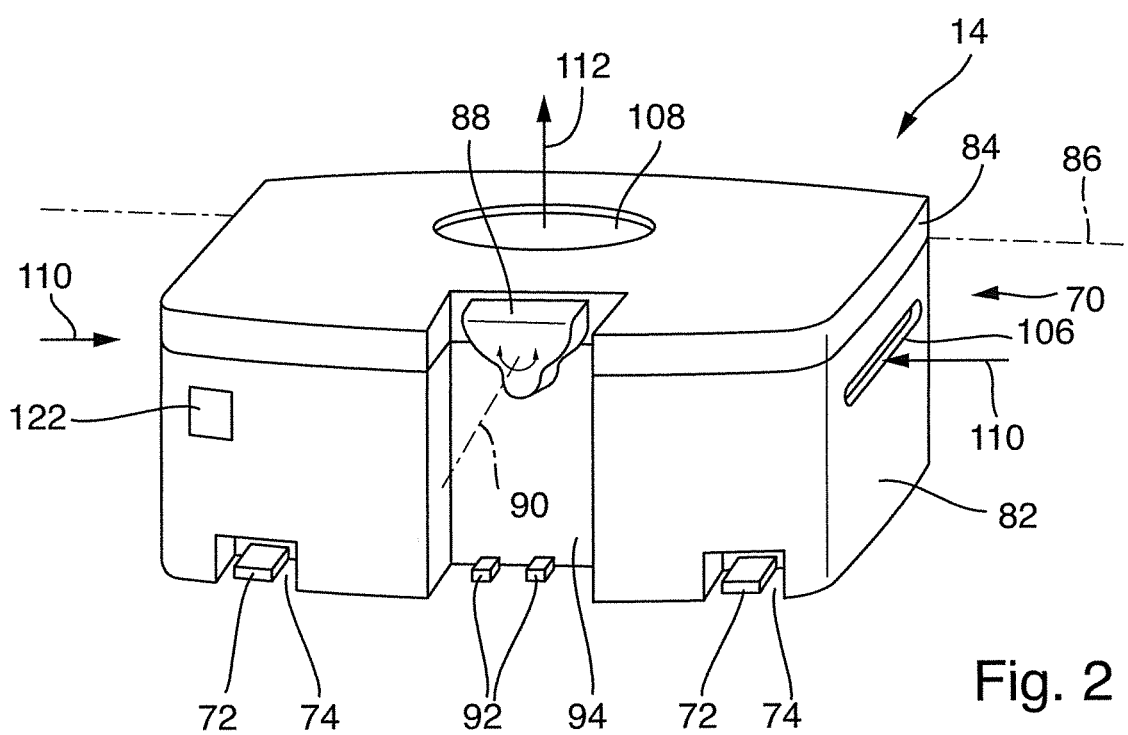
Figure 3:
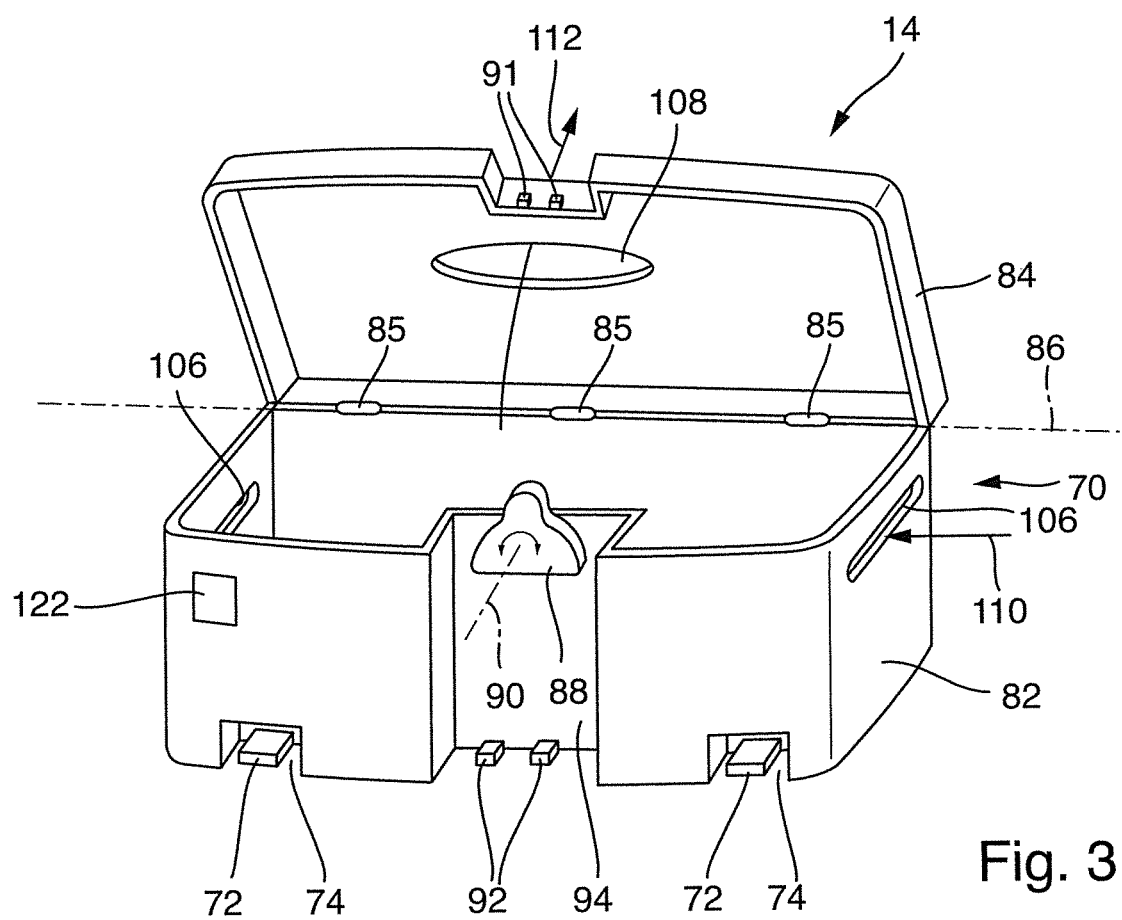
Figure 4:
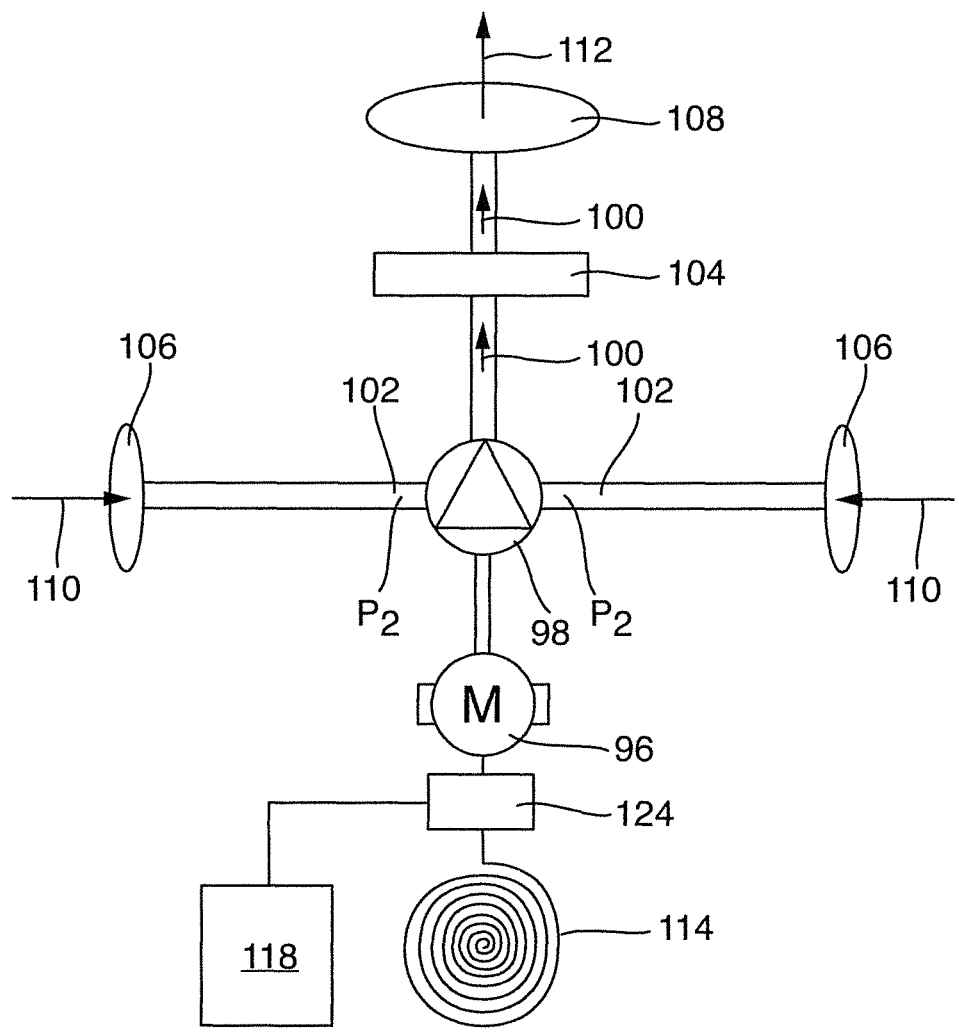
Figure 5:
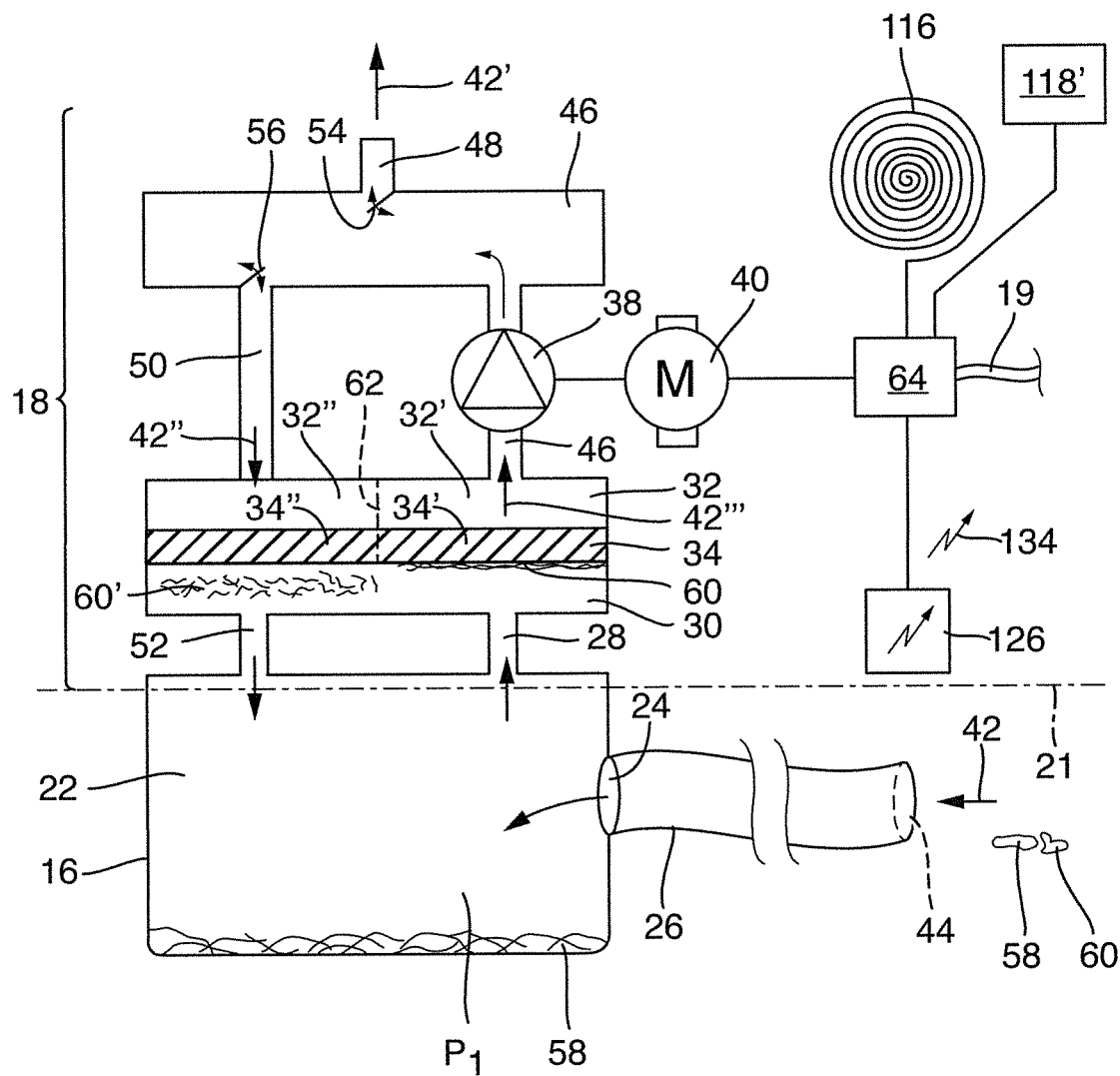
Figure 6:
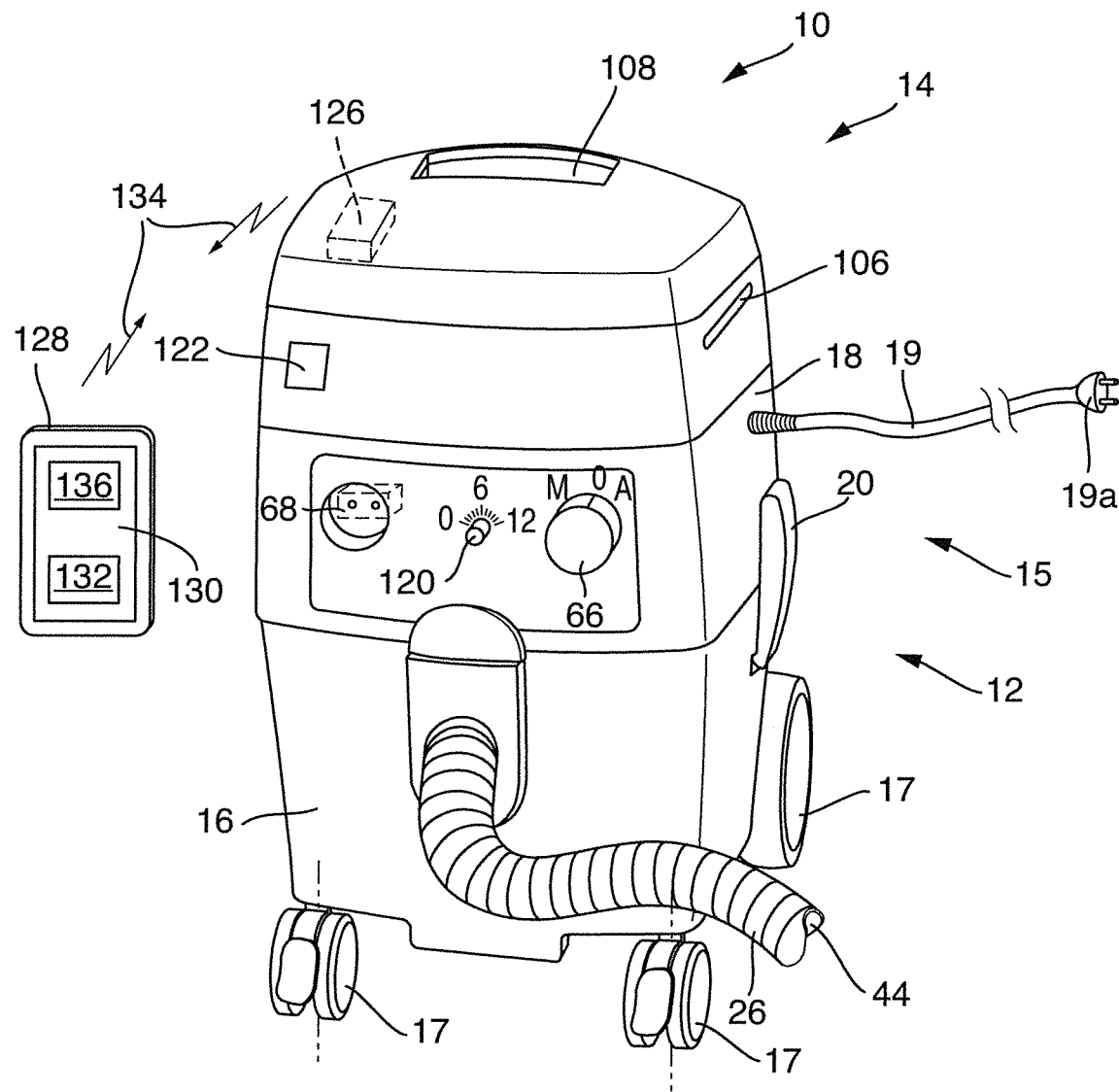

Further features and advantages of the present invention are explained in enabling detail hereinafter by making reference to preferred embodiments. It is to be understood that the various features and advantages mentioned in respect to a certain embodiment can also be applied to other embodiments, and that they may be important for the invention also separately. The figures show:

FIG. 1 a vacuum cleaner having a vacuum cleaning as well as an air purifying functionality, according to a first preferred embodiment of the present invention;

FIG. 2 a stackable case containing components for realizing an air purifying functionality and making integral part of the vacuum cleaner according to FIG. 1 when attached thereto;

FIG. 3 the stackable case of FIG. 2 with its cover element opened;

FIG. 4 components for realizing the air purifying functionality arranged inside the stackable case of FIGS. 2 and 3;

FIG. 5 components for realizing the vacuum cleaning functionality arranged inside a housing of the vacuum cleaner of FIG. 1; and FIG. 6 a vacuum cleaner having a vacuum cleaning as well as an air purifying functionality, according to a further preferred embodiment of the present invention.

In FIG. 1 a vacuum cleaner according to a first embodiment of the present invention is designated in its entirety with reference sign 10. The vacuum cleaner 10 has a vacuum cleaning functionality as well as an integrated air purifying functionality, which will be described in more detail hereinafter.

In the embodiment of FIG. 1 the vacuum cleaner 10 comprises a first part 12 for realizing the vacuum cleaning functionality and a second part 14 for realizing the air purifying functionality. The two parts 12, 14 may be releasably attached to one another so when attached to the first part 12 the second part 14 forms an integral part of the vacuum cleaner 10.

The first part 12 comprises an essentially well-known vacuum cleaner, preferably for use in professional workshops or garages, in shipyards, in hangars, in construction sites or the like. The first part 12 comprises a housing 15 consisting of a base element 16 essentially forming a dust collecting chamber 22 (see FIG. 5) in its inside and a cover element 18 releasably attached to the base element 16 by connection means 20, which may be in the form of two lateral clips, straps, shackles or the like. Of course, the connection means 20 may also be located at other positions than those shown in FIG. 1 and may be embodied differently than shown in FIG. 1. The base element 16 is provided with wheels 17 for moving the mobile vacuum cleaner 10 to a desired work position. The cover element 18 contains first components for realizing the vacuum cleaning functionality. The first part 12, in particular the cover element 18, is provided with an electric cord 19 having a plug 19a for connection to a mains socket at its distal end. The single electric cord 19 serves for proving all electric components of the vacuum cleaner 10 with electric energy.

The first components for realizing the vacuum cleaning functionality are schematically shown in FIG. 5. They comprise the dust collecting chamber 22 provided in the base element 16. The chamber 22 is open to the top and closed in an airtight manner by the cover element 18. It has an inlet opening 24 to which a suction hose or pipe 26 is connected. In FIG. 5 a dashed line 21 separates what is arranged in the cover element 18 from what is arranged in the base element 16. The cover element 18 comprises an inlet opening 28 leading from the dust collecting chamber 22 into an inlet chamber 30 and further into an outlet chamber 32. The two chambers 30 and 32 are separated from each other by means of at least one filter element 34. The outlet chamber 32 has an outlet opening 36 leading to the suction side of a first turbine 38 actuated by a first electric motor 40. The motor 40 is provided with electric energy through the electric cord 19. A control unit 64 may be located between the electric cord 19 and the motor 40. The control unit 64 may control operation of the motor 40 depending on user inputs and other operating parameters.

The turbine 38 creates an air flow 42''' leading to a low-pressure or vacuum in the outlet chamber 32 and further a low-pressure or vacuum of a first pressure value p_1 in the dust collecting chamber 22. This provokes an air flow 42 through a suction opening 44 located at a distal end of the hose or pipe 26, further leading through the dust collecting chamber 22, the inlet opening 28, the inlet chamber 30, the at least one filter element 34 and the outlet chamber 32. The air flow 42 is fast and strong and carries away dust and small particles 58, 60 located in the immediate vicinity of the suction opening 44. Thus, the air flow 42 contains dust, small debris particles and the like which are drawn into the dust collecting chamber 22. When entering the chamber 22 larger and heavier particles 58 fall to the bottom of the chamber 22. Further, when passing through the at least one filter element 34 the remaining dust and particles 60 are held back by the filter element 34 and accumulate on an input side of the filter element 34.

The air drawn by the turbine 38 is conveyed into a discharge chamber 46 and eventually discarded into the environment through a discharge opening 48. This is basically the well-known functioning of a conventional vacuum cleaner.

User inputs for controlling the operation of the first electric motor 40 can be set by means of one or more appropriate control switches and/or control dials 66 located at the front of the cover element 18 (see FIG. 1). In this example there is a control dial 66 which can be turned to a manual mode (M) for manually activating the motor 40, to an automatic mode (A) for automatically activating the motor 40 or to an off-mode (0), in which the motor 40 is turned off. In each of the activation modes (M, A), the speed of the motor 40 can be varied and preset to a desired value. An electric socket 68 is provided at the front of the cover element 18 for receiving a plug of an electric power tool (not shown). The distal end of the hose or pipe 26 with its suction opening 44 may be connected to a dust self-extraction device of the power tool. In the automatic mode (A) the first electric motor 40 is automatically activated upon activation of the power tool connected to the socket 68. By activating the vacuum cleaner most of the dust created during intended use of the power tool is drawn from the working area and its vicinity into the dust collecting chamber 22.

However, the vacuum cleaner may be equipped with additional functionalities, such as a self-cleaning function of the filter element 34. To this end the discharge chamber 46 may be equipped with an outlet opening 50 leading into the outlet chamber 32 and the inlet chamber 30 may be equipped with an outlet opening 52 leading into the dust collecting chamber 22. Furthermore, the discharge opening 48 may be equipped with a valve 54 for permitting and inhibiting an air flow 42' through the opening 48 for discarding air from the discharge chamber 46 into the environment. Similarly, the outlet opening 50 may be provided with a valve 56 for permitting and inhibiting an air flow 42" through the opening 50 and the at least one filter element 34 into the dust collecting chamber 22.

During normal operation of the vacuum cleaner the valve 54 is open and the valve 56 is closed and an air flow 42''' runs through the at least one filter element 34 in a first direction. In order to initiate a self-cleaning process of the at least one filter element 34 or of part of the filter element 34 the filter element 34 is flushed with clean air taken from the environment or from the discharge chamber 46 in an opposite direction. In particular, the valve 54 is closed leading to an increase of pressure in the discharge chamber 46 because the turbine 38 continues to draw air into the chamber 46. The valve 56 is opened thereby generating an abrupt air flow 42" directed into the outlet chamber 32 and running through the filter element 34 or part of it in a direction opposite to the air flow 42''' during normal operation of the vacuum cleaner. The valves 54 and 56 may be actuated contemporarily or one after the other, first valve 54 is closed in order to build up a high pressure in the discharge chamber 46, and thereafter valve 56 is opened in order to create a particular violent cleaning air flow 42".

As a consequence of the cleaning air flow 42", the dust and particles 60' are abruptly and violently separated from the input side of the filter element 34 and collected in the dust collecting chamber 22. During the self-cleaning process the turbine 38 may draw air from the environment and not from the outlet chamber 32. This may be achieved by means of a further opening into the environment on the suction side of the turbine 38 and a further valve element for opening and closing that opening (not shown).

With other words, the self-cleaning process of the filter element 34 provides for a cleaning air flow 42" through the filter element 34 directed opposite to the air flow 42''' during normal operation of the vacuum cleaner. The filter cleaning process is executed only from time to time, either on a user's initiative or regularly at certain points in time or when the pressure difference between the inlet chamber 30 and the outlet chamber 32 exceeds a predefined threshold value, which is indicative of the degree of clogging of the filter element 34 with dust and particles 60. The cleaning process takes only a very short time, max. a few seconds, preferably only the fraction of a second.

In order to be able to maintain the conventional vacuum cleaning functionality during the filter cleaning process, it may be possible to provide for two separate filter elements 34', 34" or for a single filter element 34 split into two halves 34', 34", and to divide the outlet chamber 32 into two separate chambers 32', 32" by means of a facultative partition wall 62 drawn in a dashed line. In that case, the right filter element 34' may still be used for the conventional vacuum cleaning process, whereas the left filter element 34" is cleaned by reverse flushing with the cleaning air flow 42". Further, appropriate further valves (not shown) may be provided in order to switch the normal operation of the vacuum cleaner to the left filter element 34" and the cleaning process by reverse flushing to the right filter element 34'.

The second part 14 of the vacuum cleaner 10 shown in FIGS. 1 and 2 comprises an external housing 70 or case containing the second components for realizing the air purifying functionality. Preferably, the external housing 70 is a stackable case which can be releasably attached to the top of the housing 15 containing the first components, in particular to the top surface of the cover element 18. Advantageously, the external housing 70 containing the second components is a case compatible with a stackable case system known, for example, from WO 2016/008 860 A1. The external housing 70 or case has attachment means at its bottom adapted for attachment to a corresponding attachment system located on the top surface of the housing 15 of the first part 12 of the vacuum cleaner 10. Such cases are well-known in the art and usually serve for storing tools, spare parts, consumables for the tools, etc. These cases 70 can be stacked one on top of another and can be secured to one another in their stacked position by quick-fastening means, e.g. latches or turn-lock fasteners.

To this end, case 70 comprises protrusions 72 located in recesses 74 at the front of the case 70. Similar recesses and protrusions are provided at the back of the case 70. Further, similar recesses and protrusions may be provided on the sides of the case 70, too (not shown). For attaching the case 70 to the top of the cover element 18, first the protrusions at the back of the case 70 are inserted into corresponding receiving cavities 76 provided in a back wall 78 on top of the cover element 18. Then the case 70 is laid on the top surface of the cover element 18 by swivelling it downwards about a swivel axis 79 running through the cavities 76. The top of the housing 15 containing the first components and the bottom of the case 70 are designed accordingly, in order to hold the case 70 in a predefined position on top of the housing 15 in an x-y-plane (essentially corresponding to the plane of extension of the bottom surface of the case 70 when it rests on top of the housing 15). The case 70 is secured to the top of the housing 15 in this position by means of appropriate fastener elements 78, which may comprise latches rotatable about rotation axes 80. The latches 78 engage behind the protrusions 72 located at the front of the case 70, thereby securing the case 70 also in a z-direction. The receiving cavities 76 and the fastener elements 78 form the attachment system located on the top of the housing 15 of the first part 12 of the vacuum cleaner 10. Of course, the attachment system of the vacuum cleaner can be embodied in any other way, too, as long as it is compatible with the corresponding attachment means of the case 70.

The case 70 comprises a base element 82 and a cover element 84. The cover element 84 is attached to the base element 82 by means of hinges 85 (see FIG. 3) extending along at least part of the back of the case 70. Hence, the cover element 84 can be opened by swivelling it about a rotational axis 86. The case 70 is provided with a locking member 88 (turn-lock fastener) located at the front of the case 70. The locking member 88 is rotatably attached to the base element 82 and can be rotated about a rotational axis 90 in order to bring it into three different rotational positions. In a locking position shown in FIGS. 1 and 2, the locking member 88 locks the cover element 84 in its closed position by entering into engagement with at least one protrusion 91 located at the front of the cover element 84 of the case 70 at a respective position corresponding to the locking member 88. A rotation of the locking member 88 by 180° brings it into a releasing position in which the cover element 84 can be opened (see FIG. 3). In the releasing position the at least one protrusion 91 is released. In a further securing position (not shown) located at 90° between the locking position and the releasing position the cover element 84 is secured in its closed position. Additionally, the locking member 88 enters into engagement with protrusions of another case located on top of the case 70, the protrusions of the other case corresponding to protrusions 92 of the case 70 located at the bottom and the front of the case. Thus, in the securing position the other case is also secured to the top of the case 70. The locking member 88, the protrusions 91 and 92 are preferably located in a recess 94 extending at the front of the case 70. This has the advantage that no parts of the case 70 protrude its external walls.

The second components are arranged inside the case 70, in particular inside of the base element 82. The second components interoperate with one another in order to realize a second air flow for a purifying functionality of dust-laden air surrounding the vacuum cleaner 10, hence for realizing the air purification function. The second components are schematically shown in FIG. 4. They are provided separate from the first components for realizing the vacuum cleaning functionality. They comprise a second electric motor 96, a second turbine 98 actuated by the second electric motor 96 in order to create the second air flow 100, and at least one air filter element 104 through which the second air flow 100 is drawn in order to filter out most of the dust contained in the air of the second air flow.

A low-pressure or vacuum $p\_1$ created by the first turbine 38 in the dust collecting chamber 22 is much lower than a low-pressure $p\_2$ created by the second turbine 98 on its suction side. The second turbine 98 is optimized for creating a large-volume air circulation (flow rate). In particular, the air purifier comprising the second components can realize a flow rate of more than 500 $m^3$/hour, preferably a flow rate of 700 $m^3$/hour or more. During operation, the motor 96 is provided with electric energy and drives the turbine 98. In this embodiment the suction side of the turbine 98 is connected to two rather large inlet ports 106 provided in the case 70. Hence, during operation the turbine 98 draws a large volume of air from the environment through the inlet ports 106 and conveys the air flow 100 through the filter element 104 and then discards it to the environment again through a rather large outlet port 108 provided in the case 70. In the shown embodiment the outlet port 108 is provided in a recess in the top wall of the cover element 84. At the same time the recess also forms a handle for carrying the case 70 when detached from the housing 15 of the first part 12 of the vacuum cleaner 10. Of course, the number, form and arrangement of the inlet and outlet ports 106, 108 may vary from what is shown in FIGS. 1 to 3.

The dust-laden air 110 from the environment surrounding the vacuum cleaner 10 and being sucked into the inlet ports 106 has dust and small particles floating therein. These dust and small particles are mainly caused by the intended use of the power tool attached to the socket 68 and to the suction opening 44 of the hose or tube 26 of the vacuum cleaner 10 or by any other dirty or heavy work performed near the vacuum cleaner 10. The purified air 112 discarded to the environment through the outlet port 108 is essentially free of dust or particles because they have been discarded on the input side of the filter element 104. In particular, the air purifier filters 95% to 98% of the dust and particles out of the dust-laden air 110. All of the components shown in FIG. 4 are arranged in the case 70.

Preferably, the second electric motor 96 is provided with electric energy reaching the first part 12 of the vacuum cleaner 10 through the electric cord 19. With the external housing 70 or case of the second part 14 being separate from the housing 15 of the first part 12 it is necessary to transmit electric energy from the first part 12 of the vacuum cleaner 10 to the second components located in the case 70. To this end it is suggested that the top of the first part 12 of the vacuum cleaner 10 and the bottom of the stackable case 70 are provided with electric energy transmitting means in order to transmit electric energy from the first part 12 of the vacuum cleaner 10 to the second electric motor 96 arranged in the stackable case 70. Preferably, upon positioning or attachment, respectively, of the stackable case 70 on top of the housing 15 of the first part 12 of the vacuum cleaner 10 the electric energy transmitting means automatically enter into a mutual energy transmitting state, in which electric energy can be transmitted from the first part 12 of the vacuum cleaner 10 to the second electric motor 96.

For example, the electric energy transmitting means for transmitting electric energy may be designed as a plug and socket combination (not shown) at respective positions in the bottom wall of the case 70 and the top wall of the housing 15 of the first part 12 of the vacuum cleaner 10. Preferably, the electric energy transmitting means make use of any type of wireless power transmission technique. In near field or non-radiative techniques, power is transferred by magnetic fields using inductive coupling between coils of wire, or by electric fields using capacitive coupling between metal electrodes. Advantageously, at bottom of the case 70 and at the top of the housing 15 of the first part 12 of the vacuum cleaner 10 appropriate coils of wire 114, 116 are provided for realizing an inductive coupling for the wireless power transmission. In that case the electric energy comes from the mains socket to the control unit 64 via the electric cord 19 (see FIG. 5). From there it is transmitted to the coil 116, from which it is transmitted inductively to the coil 114 (see FIG. 4) located at the bottom of the case 70 at a position corresponding to the position of the coil 116 at the top of the housing 15 of the first part 12 of the vacuum cleaner 10, when the case 70 is secured to the top of the housing 15. The electric energy received by the coil 114 is then used for operating the second electric motor 96. Between the coil 114 and the second electric motor 96 a separate control unit 124 for controlling operation of the second motor 96 may be provided.

Furthermore, it is suggested that the vacuum cleaner 10 comprises at least one rechargeable battery 118 and/or 118' adapted for supplying the second electric motor 96 of the air purifier with electric energy when the plug 19a of the electric cord 19 of the vacuum cleaner 10 is disconnected from the mains socket. The battery may be arranged in the first part 12 of the vacuum cleaner 10, in particular in the cover element 18 (battery 118' in FIG. 5). Preferably, the battery is arranged in the second part 14, in particular in the stackable case 70 (battery 118 in FIG. 4). Advantageously, the battery 118, 118' is charged according to a predefined charging process or scheme when the plug 19a of the electric cord 19 of the vacuum cleaner 10 is connected to a mains socket. To this end, the battery 118, 118' can take over the energy supply of the second electric motor 96 of the air purifier at least when the plug 19a is detached from the mains socket. It is even possible that the second electric motor 96 is exclusively operated through the battery 118, 118'. Operation of the second electric motor 96 by means of the battery 118, 118' is in particular possible because the electric motor 96, other than the first electric motor 40 for realizing the vacuum cleaning functionality, has a rather low power consumption (in the range of several 10 W, e.g. 30 W to 100 W).

If the battery 118' is located in the first part 12 of the vacuum cleaner 10, the electric energy supplied by the battery 118' will have to be transmitted to the second electric motor 96 through the electric energy transmitting means as described above. In that case the battery 118' can be directly charged by electric current arriving at the control unit 64 through the electric cord 19. In the other case, when the battery 118 is located in the second part 14 of the vacuum cleaner 10, in particular in the case 70, the electric energy supplied by the battery 118 can be directly transmitted to the second electric motor 96 through internal cables or the like. However, in that case the electric current arriving at the control unit 64 through the electric cord 19 has to be transmitted through the electric energy transmitting means, as described above, for charging the battery 118.

There are many different possibilities for activating and/or deactivating the second electric motor 96 for realizing the air purifier functionality. For instance, it is suggested that the second electric motor 96 is automatically activated upon activation of the first electric motor 40 of the vacuum cleaner. An appropriate control of the second electric motor 96 can be achieved by the control unit 124 possibly in combination with the control unit 64.

Further, it is possible that the second electric motor 96 is automatically deactivated after a preset time delay after deactivation of the first electric motor 40. The time delay may be set by a user or worker to any desired time duration. It may even be set to zero (time delay=0 sec) in order to turn off the second motor 96 contemporarily with the first motor 40. However, it is advantageous that the second motor 96 runs longer than the first motor 40 (time delay >0 sec) in order to purify the dust-laden air surrounding the vacuum cleaner 10 and to filter dust and small particles out of the air flow 100. The dust and small particles floating in the dust-laden air may result from the previous intended use of the power tool connected to the socket 68 and the suction opening 44 of the hose or tube 26 or from any other work previously performed near the vacuum cleaner 10. Purifying the dust-laden air may take up to several hours (time delay=x hours, x=1 . . . 12).

Furthermore, it is possible that the vacuum cleaner 10 comprises a timer switch 120 adapted for automatically activating and deactivating the second electric motor 96 at preset points in time. The timer switch 120 may be part of the second part 14 of the vacuum cleaner 10. However, preferably it is located in the cover element 18 of the first part 12 of the vacuum cleaner 10 next or near to the control dial 66 for controlling operation of the first electric motor 40. The points in time for activating and deactivating the air purifier may be manually set by a user or worker, for example when leaving the construction site or the professional workshop or garage after work. The timer switch 120 may be of a mechanical type. If it is of an electrical type, it may be provided with electric energy by means of the electric cord 19 plugged into the mains socket or by the battery 118, 118' forming part of the vacuum cleaner 10.

Finally, it is also possible that the vacuum cleaner 10 comprises a particle sensor 122 which is in direct contact with the surroundings (i.e. the environment) of the vacuum cleaner 10 and adapted for measuring the number of particles in a given volume of dust-laden air surrounding the vacuum cleaner 10 and for automatically activating the second electric motor 96 of the air purifier when the measured number of particles exceeds a preset first threshold value and for automatically deactivating the second electric motor 96 when the measured number of particles falls below a preset second threshold value. The first and second threshold values for the number of particles in a given volume may be the same. Preferably, the second threshold value is smaller than the first threshold value, thereby providing for some kind of hysteresis.

It is possible that the air purifier located in the case 70 comprises its own control unit 124 for controlling operation of the second motor 96 and/or the charging process of the battery 118. However, it would also be possible that the air purifier makes use of the control functionalities provided by the control unit 64 of the first part 12 of the vacuum cleaner 10. In that case the control functionalities of the control unit 64 would have to be expanded in order for the control unit 64 to be able to control the operation of the second motor 96 and/or the charging process of the battery 118, too. This can be achieved by installing an appropriate computer program which can be executed on a processor of the control unit 64. In that case, a wireless data transmission connection between the first part 12 and the second part 14 of the vacuum cleaner 10 would have to be provided, too, in order to transmit control signals from the control unit 64 to the second components located in the case 70. It would be possible to use the two wire coils 114, 116 for establishing the wireless data transmission connection.

A further embodiment of the present invention is shown in FIG. 6. Other than in the first embodiment, the two parts 12, 14 are actually one single common part resulting in the vacuum cleaner 10 having only a single housing 15 in which the first components (see FIG. 5) for realizing the vacuum cleaning functionality as well as the second components (see FIG. 4) for realizing the air purifying functionality are arranged. Again, it is preferred that the housing 15 comprises a base element 16 and a cover element 18. The first components as well as the second components are preferably all arranged in the cover element 18. To this end, the cover element 18 may be designed larger than in conventional vacuum cleaners in order to additionally accommodate the second components for realizing the air purifying functionality therein.

Further, it is suggested that the vacuum cleaner 10 comprises a wireless interface 126 (see FIGS. 1, 5 and 6) adapted for establishing a wireless connection 134 with a mobile device 128 (see FIG. 6) and control means adapted for permitting control of the first electric motor 40 and/or of the second electric motor 96 by means of the mobile device 128. The control means may be realized in the control unit 64 and/or in the control unit 124 or separately from the control units 64, 124. If realized in one or both of the control units 64, 124 the functionality of the control units 64, 124 has to be expanded in order to allow control of the first electric motor 40 and/or of the second electric motor 96 by means of the mobile device 128. This can be achieved by installing an appropriate computer program to be executed by a processor of the control unit 64, 124 which is adapted for realizing the control of the first electric motor 40 and/or of the second electric motor 96 by means of the mobile device 128, when running on the processor.

On the other hand, a computer program (so-called application or App) to be executed by a processor of the mobile device 128 is provided on the mobile device 128. The computer program is adapted for establishing the wireless connection 134 between the wireless interface 126 and the mobile device 128 and to send appropriate control commands to the vacuum cleaner 10 in order to provide for control of the first electric motor 40 and/or of the second electric motor 96 by means of the mobile device 128 via the established wireless connection 134. To this end, the mobile device 128 may have a screen 130 allowing a user or worker to enter desired control commands for the vacuum cleaner 10 by means of a control window 132 displayed on the screen 130. Alternatively, the control commands may also be input by the user or worker by means of a keypad or the like provided in the mobile device 128. Controlling of the vacuum cleaner 10 by means of the mobile device 128 may comprise one or more of the following actions: turning on/off the first electric motor 40 and/or the second electric motor 96, setting the speed of the motors 40, 96, and setting values for the timer switch 120 or threshold values for the particle sensor 122.

Additionally, the established wireless connection 134 between the wireless interface 126 of the vacuum cleaner 10 and the mobile device 128 may be used for a wireless data transmission from the vacuum cleaner 10 to the mobile device 128 for transmitting operation parameters and data regarding the first components and/or the second components to the mobile device 128 for presentation on the screen 130. In particular, the data may be displayed in a special part of the screen 130, e.g. an information window 136. Of course, the display on the screen 130 does not necessarily have to be split up into control window 132 and information window 136. Instead it could be possible to switch between these two windows 132, 136 by means of a pulldown menu making part of the computer program or simply by swiping over the screen 130. Information or data to be displayed on the screen 130 may comprise the current on/off status of the first electric motor 40 and/or the second electric motor 96, current speed settings of the motors 40, 96, current clogging status of the filter elements 34, 104, estimated future time of replacement of the filter elements 34, 104, current setting values of the timer switch 120 or of the threshold values for the particle sensor 122, and current fill level of the dust collection chamber 22.

It is in particular suggested that the mobile device 128 is one of a smart phone, a tablet computer and a palm computer. The wireless interface 126 is adapted for realizing a Bluetooth-, a WiFi-, a NFC- and/or a telecommunication connection (e.g. GSM, EDGE, UMTS, LTE or any other standard known at present or to be realized in future) with the mobile device 128.

The invention claimed is:

1. Vacuum cleaner (10) comprising a housing (15) with first components arranged therein which interoperate with one another in order to realize a first air flow (42''') for a vacuum cleaning functionality, the first components comprising a first electric motor (40) and a first turbine (38) actuated by the first electric motor (40) in order to create the first air flow (42''') and a low-pressure or vacuum in a dust collecting chamber (22) of the vacuum cleaner (10) provided with an inlet opening (24) in order to suck in dust and small particles into the dust collecting chamber (22), wherein the vacuum cleaner (10) further comprises second components separate from the first components and the second components interoperating with one another in order to realize a second air flow (100) for a purifying functionality of dust-laden air (110) surrounding the vacuum cleaner (10), the second components comprising a second electric motor (96), a second turbine (98) actuated by the second electric motor (96) in order to create the second air flow (100), and at least one air filter element (104) through which the second air flow (100) is drawn in order to filter out dust and small particles from the second air flow (100), wherein the first turbine (38) sucks air through the inlet opening (24) of the dust collecting chamber (22) and the second turbine (98) sucks air through at least one inlet port (106) separate from the inlet opening (24).

2. Vacuum cleaner (10) according to claim 1, wherein the second components are arranged in the housing (15) of the vacuum cleaner (10).

3. Vacuum cleaner (10) according to claim 2, wherein the housing (15) of the vacuum cleaner (10) comprises a base element (16) essentially forming the dust collecting chamber (22) and a cover element (18) releasably attachable to the base element (16) and containing the first components (38, 40) for realizing the vacuum cleaning functionality and the second components (96, 98, 100) for realizing the air purifying functionality.

4. Vacuum cleaner (10) according to claim 1, wherein the second components (96, 98, 100) are arranged in an external housing (70) or case separate from the housing (15) containing the first components (38, 40), wherein the external housing (70) or case containing the second components (96, 98, 100) is releasably attached to the housing (15) containing the first components (38, 40).

5. Vacuum cleaner (10) according to claim 4, wherein the external housing (70) or case containing the second components (96, 98, 100) is a stackable case provided with attachment means at its bottom adapted for being releasably attached to a corresponding attachment system located on the top of the housing (15) containing the first components (38, 40).

6. Vacuum cleaner (10) according to claim 4, wherein the top of the housing (15) containing the first components (38, 40) and the bottom of the external housing (70) or case containing the second components (96, 98, 100) is provided with electric energy transmitting means (114, 116) in order to transmit electric energy from the first components (38, 40) to the second electric motor (96) arranged in the external housing (70) or case containing the second components (96, 98, 100), wherein upon positioning or attachment, respectively, of the external housing (70) or case containing the second components (96, 98, 100) to the top of the housing (15) containing the first components (38, 40) the electric energy transmitting means (114, 116) automatically enter into a mutual energy transmitting state, in which electric energy can be transmitted from the first components (38, 40) to the second electric motor (96).

7. Vacuum cleaner (10) according to claim 1, wherein the vacuum cleaner (10) comprises a single electric cord (19) with a plug (19a) for connection to a mains socket, the electric cord (19) adapted for supplying the first electric motor (40) as well as the second electric motor (96) with electric energy.

8. Vacuum cleaner (10) according to claim 4, wherein the external housing (70) or case containing the second components (96, 98, 100) is provided with an electric cord with a plug for connection to a mains socket, the electric cord adapted for supplying the second electric motor (96) with electric energy independently from a power supply to the first electric motor (40).

9. Vacuum cleaner (10) according to claim 1, wherein the second electric motor (96) is automatically activated upon activation of the first electric motor (40).

10. Vacuum cleaner (10) according to claim 1, wherein the vacuum cleaner (10) comprises a timer for automatically deactivating the second electric motor (96) after a preset time delay, the time delay starting after deactivation of the first electric motor (40).

11. Vacuum cleaner (10) according to claim 1, wherein the vacuum cleaner (10) comprises a timer switch (120) adapted for automatically activating and deactivating the second electric motor (96) at preset points in time.

12. Vacuum cleaner (10) according to claim 1, wherein the vacuum cleaner (10) comprises a particle sensor (122) in contact with the surroundings of the vacuum cleaner (10) and adapted for measuring the concentration of dust and small particles in the dust-laden air surrounding the vacuum cleaner (10) and for automatically activating the second electric motor (96) when the measured concentration exceeds a preset first threshold value and/or automatically deactivating the second electric motor (96) when the concentration falls below a preset second threshold value.

13. Vacuum cleaner (10) according to claim 1, wherein the vacuum cleaner (10) comprises a rechargeable battery (118, 118') adapted for supplying the second electric motor (96) with electric energy at least when a plug (19a) of an electric cord (19) of the vacuum cleaner (10) is disconnected from a mains socket.

14. Vacuum cleaner (10) according to claim 13, wherein the battery (118, 118') is automatically charged according to a predefined charging scheme when the plug (19a) of the electric cord (19) of the vacuum cleaner (10) is connected to a mains socket and an energy transmitting connection is established between the electric cord (19) and the battery (118, 118').

15. Vacuum cleaner (10) according to claim 1, wherein the vacuum cleaner (10) comprises a wireless interface (126) adapted for establishing a wireless connection (134) with a mobile device (128) and control means adapted for permitting control of the first electric motor (40) and/or of the second electric motor (96) by means of the mobile device (128) via the established wireless connection (134).

16. Vacuum cleaner (10) according to claim 1, wherein the vacuum cleaner (10) comprises a wireless interface (126) adapted for establishing a wireless connection (134) with a mobile device (128) and data transmission means adapted for transmitting operation parameters and data regarding the first components (38, 40) and/or the second components (96, 98, 100) to the mobile device (128) via the established wireless connection (134) for presentation on a screen (130) of the mobile device (128).

17. Vacuum cleaner (10) according to claim 15, wherein the mobile device (128) is one of a smart phone, a tablet computer and a palm computer, and wherein the wireless interface (126) is one of a Bluetooth-, a WiFi-, a NFC and/or a mobile telecommunication-interface.

18. Vacuum cleaner (10) according to claim 5, wherein the top of the housing (15) containing the first components (38, 40) and the bottom of the external housing (70) or case containing the second components (96, 98, 100) is provided with electric energy transmitting means (114, 116) in order to transmit electric energy from the first components (38, 40) to the second electric motor (96) arranged in the external housing (70) or case containing the second components (96, 98, 100), wherein upon positioning or attachment, respectively, of the external housing (70) or case containing the second components (96, 98, 100) to the top of the housing (15) containing the first components (38, 40) the electric energy transmitting means (114, 116) automatically enter into a mutual energy transmitting state, in which electric energy can be transmitted from the first components (38, 40) to the second electric motor (96).

19. Vacuum cleaner (10) according to claim 2, wherein the vacuum cleaner (10) comprises a single electric cord (19) with a plug (19a) for connection to a mains socket, the electric cord (19) adapted for supplying the first electric motor (40) as well as the second electric motor (96) with electric energy.

20. Vacuum cleaner (10) according to claim 5, wherein the external housing (70) or case containing the second components (96, 98, 100) is provided with an electric cord with a plug for connection to a mains socket, the electric cord adapted for supplying the second electric motor (96) with electric energy independently from a power supply to the first electric motor (40).

\* \* \* \* \*